June 23, 1970  A. W. SAY  3,516,629
SPRING-SUPPORTED UNIT PLATES, MORE PARTICULARLY
FOR GRAMOPHONE RECORD PLAYERS
Filed Sept. 23, 1968
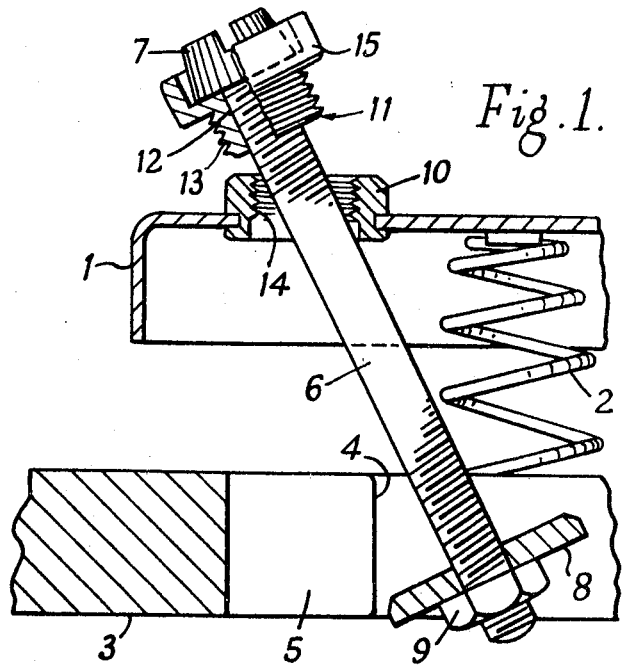
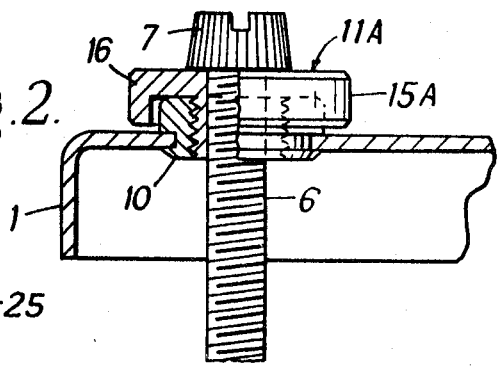
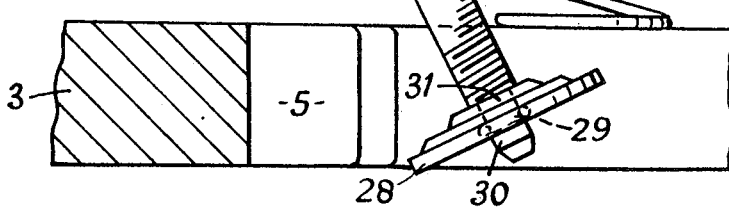

United States Patent Office 3,516,629
Patented June 23, 1970

3,516,629
SPRING-SUPPORTED UNIT PLATES, MORE PARTICULARLY FOR GRAMOPHONE RECORD PLAYERS
Alan W. Say, Ilford, England, assignor to The Plessey Company Limited, Ilford, England, a British company
Filed Sept. 23, 1968, Ser. No. 761,528
Claims priority, application Great Britain, Sept. 29, 1967, 44,570/67
Int. Cl. F16f 15/06
U.S. Cl. 248—20     7 Claims

ABSTRACT OF THE DISCLOSURE

To permit an anchoring or locking screw for a record-player unit plate, which is accessible only at its head end, to be swivelled into and out of slots in a mounting board, a screw-threaded shaft portion cooperates with screw threads in a separate nut element which either can swivel in the unit plate or is inserted in a larger diameter bore by screw threads of opposite pitch or a bayonet fixture.

---

This invention relates to unit plates which are normally supported on a base board by means of springs and is more particularly though not exclusively intended for spring-mounted unit plates of gramophone record players. Such unit plates are during normal use of the player connected with a base board or mounting board exclusively by springs in order to minimise the transmission of vibrations between the base and the unit, but because in this condition the gramophone is too sensitive to be transported, it is usual to provide anchoring screws which extend through apertures in the unit plate and the mounting board, and which can be tightened to compress the springs and thus lock the unit relative to the mounting board for safety in transport. Before the gramophone is used, these anchoring screws are slackened to allow free play of the supporting springs. In one convenient construction the screws are headed and are each arranged to engage, adjacent to their head, screw threads in a boss or the like extending through the unit plate, while the other end of each screw extends through an aperture in the mounting board and is formed, at the back of the mounting board, with a collar or shoulder which, when the head of the screw is turned to rise from the unit plate, applies itself to the underside of the mounting board, so that further rotation of the screw in the same direction will draw the unit plate towards the mounting board, thus compressing the springs. When the unit is locked for transport, the head and the adjacent end portion of each anchoring screw projects from the unit plate, while for a normal use of the unit the screws can be screwed home to give a neat appearance to the unit. The mounting board normally projects laterally only by a small distance underneath the unit plate in order to provide an opening through which the gramophone drive can project from the unit plate into the housing of the player, and to facilitate assembly, it is convenient to form the apertures in the mounting plate through which the screws extend, as slots extending from this opening. This arrangement permits the collar on at least some of these screws to be permanently attached to the screws before the unit is combined with the mounting plate, and in order to permit this to be done in the case of all screws, it is desirable to so arrange one or more of the screws in the unit plate as to permit it to execute a lateral swivel movement into and out of the associated slot of the mounting board.

With this object in view it has previously been proposed to provide the shaft of such anchoring screw with a reduced-diameter portion between the head and the threaded portion of the screw which is used to draw the unit plate towards the anchoring plate, thus permitting the desired swivel movement of the screw when this reduced-diameter portion extends through the threaded bore of the unit plate. In this case, when it is desired to lock the unit plate for transport, the screw is pulled out manually sufficiently to permit engagement of its screw-threaded portion with the screw threads of the unit plate while at the same time turning the screw sufficiently to ensure cooperation of the respective screw threads during the subsequent rotation to compress the springs.

The present invention has for an object to provide an improved arrangement which does away with the necessity of providing a reduced-diameter portion of the screw between its head and the screw-threaded portion operative during locking, and thus avoids the necessity of lifting and turning the screw manually before the locking operation proper can commence. According to the present invention the screw thread of at least one anchoring screw cooperates with a female screw thread in a member which is movable relative to the unit plate in such manner as to permit, when the anchoring screw is slack, swivel movement of the screw to disengage the associated slot of the mounting plate. While this may, for example, be achieved by providing the female screw thread in a nut member which so engages a recess in the outer surface of the unit plate as to be capable of swivel movement without rotation about the axis of the thread, the nut member is, in one convenient form of the invention, arranged to be withdrawable from a larger-diameter aperture of the unit plate, for example by being provided with external as well as internal screw threads, the former being arranged to engage screw threads provided in a through bore of the unit plate. This through bore may extend through a boss of the unit plate and has a diameter sufficiently greater than the outside diameter of the screw threads of the anchoring screw to permit, when the nut member is removed from said larger bore, the anchoring screw to perform the desired swivel movement in this through bore. When the through bore is provided in a boss projecting outwardly from the unit plate, the nut member may be provided, if desired, with a cap-like collar shrouding the outwardly projecting portion of the boss.

One embodiment of the invention and two modifications thereof are illustrated in the accompanying drawing, in which FIG. 1 is a sectional elevation of part of a gramophone record-player showing part of the mounting board and unit plate together with an anchoring screw with the nut member removed from the screw threads in a boss of the unit plate and the anchoring screw tilted in the boss to allow its collar to clear a slot in the mounting plate.

FIG. 2 is a similar elevation showing part of the unit plate together with an anchoring-screw receiving nut and part of an anchoring screw, in a slightly modified form of the invention and FIG. 3 is an elevation similar to FIG. 1 illustrating another modification.

Referring now first to FIG. 1, a pressed unit plate 1 having a downwardly projecting circumferential flange is supported by a number of tapered helical springs 2, of which only one is shown in the fragmentary section of FIG. 1, on a wooden mounting board 3 forming part of a gramophone housing. The board 3 has a central opening 4 to permit parts of the gramophone-drive mechanism to project downwardly from the unit plate below the surface of the mounting board 3, and from this central opening 4 a number of slots 5 extend outwardly towards the edge of the mounting plate to permit the passage of anchoring screws. One anchoring screw is shown in the drawing and comprises a screw-threaded stem 6 attached at its upper end to a head 7, shown as a slotted cheese-head, while at its lower end the stem 6 carries a collar 8 of a diameter greater than the width of the slot 5. This collar is illustrated as having a screw-threaded bore in engagement with the screw threads of the stem 6 and being locked in position by a counternut 9.

In the illustrated position of the screw, the stem 6 extends with clearance through the bore of a boss 10 secured in the unit plate 1 and is tilted to one side, as permitted by this clearance, sufficiently for the collar 8 to be wholly within the central aperture 4 of the mounting board 3 so as to permit the unit plate 1 to be vertically lifted away from the mounting board 3. It will be readily seen that on the other hand the stem 6 can be swung into a vertical position, in which it will pass through the slot 5 of the mounting plate with the collar 8 below the lower surface of the latter.

In order now to permit the use of the anchoring screw to lock the unit plate 1 by drawing the latter towards the mounting board 3 so as to compress the spring 2, the illustrated device is further provided with a nut member 11 having internal screw threads 12 for engagement with the external screw threads of the stem 6 and also having external screw threads 13 whose helical inclination is opposite to that of the internal screw threads 12 of the nut member and which are preferably quick-pitch threads engaging corresponding internal screw threads 14 of the boss 10.

The nut member 11 is formed with a flange portion 15 of greater external diameter than the external screw threads 13. This flange portion forms a shoulder which, when the external screw threads 13 of the nut member 11 are screwed home in the screw threads 14 of the boss 10, cooperates with the outer end surface of this boss, and the circumferential surface of the flange portion 15 is knurled to facilitate insertion of the nut member into and its removal from the screw threads of the boss 10; at its upper surface the flange portion is preferably counter-bored to accommodate part of the height of the head 7 of the anchoring screw. When the nut member 11 has been screwed home into the boss 10, the internal screw thread of the nut member is fixed relative to the unit plate 1, and if the anchoring screw 6 is now turned by means of its head 7 in an anticlockwise direction when seen from the upper end, the screw 6, which has right-hand screw threads, will rise, causing its collar 8 to make contact with the lower surface of the mounting plate 3, whereafter further rotation of the screw 6 in the same direction will force the nut 11, and with it the anchoring plate 1, towards the mounting plate 3 to lock the unit plate in position. Since the external threads 13 of the nut member are left-hand threads, the frictional torque transmitted to the nut member 11 during this operation will tend to further tighten the nut members 11 in the boss 10, thus ensuring that the pulling action of the anchoring screws is not rendered ineffective by partial unscrewing of the nut member 11 in the thread 14 of the boss 10.

On arrival of the unit at its destination, the anchoring screw is moved back to its slack position by turning of its head in a clockwise direction, thereby first allowing the unit plate 1 to rise to its normal position and then the collar 8 of the anchoring screw to become lowered clear of the under surface of the mounting board 3.

The construction of FIG. 2 only differs from the construction just described with reference to FIG. 1 by the use of a different form of nut member 11a. In this construction the outside diameter of the flange position 15a is made substantially greater than the outside diameter of the boss 10, and the flange is counter-bored at its lower side to form a collar 16 which encircles the outwardly projecting portion of the boss 10 for the greater part of its length, while the outer surface of the nut member 11a, which supports the head 7 of the screw, is left plane.

The illustrated embodiments may be modified in other details within the scope of the invention. Thus the nut member, instead of being secured in the unit plate by screw threads may be connected thereto by a bayonet connection as illustrated in FIG. 3.

In this embodiment parts substantially identical with those illustrated in FIG. 1 have been indicated by the same reference numbers, so that it will be sufficient to describe mainly the modified portions.

The nut 11 of FIG. 1, which in addition to its internal screw threads 12 has an external screw thread 13, has been replaced by a modified nut 21 which, instead of the external screw threads, has external bayonet lugs 23 adapted to be inserted through bayonet slots 24 in the unit plate 1, these slots being joined by bayonet locking ramps 25 so that, when the bolt 6 has been tilted back from the illustrated swung-out position to its normal position in which the shaft of the bolt 6 extends perpendicularly to the upper surface of the unit plate 1, the nut can be secured in position by simply plugging it in to allow its lugs 23 to penetrate through the slots 24, and then turning it by an angle of, say 90° in order to lock the nut in the unit plate 1. This allows the unit plate to be clamped for transport when desired in exactly the same way as it is effected after the threads 13 of the nut 11 have been screwed home in the case of FIG. 1.

The embodiment of FIG. 3 shows some further slight modifications compared with that of FIG. 1. Thus the knurled flange 15 has been replaced by a knob-like collar 25, and the pressure plate 8 of FIG. 1, which is secured on the screw 6 by internal screw threads with the addition of a locking nut 9, has been replaced by a collar 28 which is held on a reduced-diameter end portion 30 at the end of the screw 6 between a shoulder 31, formed at the junction of the reduced-diameter portion 30 and the stem 6 proper, and a circlip (split locking ring) 29 engaged in a groove of the reduced-diameter portion 30.

I claim:
1. A releasable locking device for an equipment-carrier plate supported by springs on, and in normally spaced relation above, a mounting board having an aperture smaller than the carrier plate and anchoring slots extending outwardly from said aperture, the locking device comprising in combination a plurality of locking screws each having a head and a shaft which extends from said head, the shaft of at least one of said screws including a screw-threaded portion adjacent to the head, a support ring for said at least one screw, which has internal screw threads cooperating with the threads of the said portion of the shaft of the screw, an equipment-carrier plate having for each said screw a hole aligned with one of said slots of such mounting board, the hole for said at least one screw being substantially greater in diameter than said threaded portion of the shaft of said screw, said carrier plate and the support ring of said at least one screw having complementary support-and-centering means for supporting said ring on said carrier plate against longitudinal pull of the shaft of said screw and for centering the screw relative to its associated hole in the carrier plate, an abutment collar for said at least one screw secured to the shaft of said screw adjacent the end of the screw remote from its head for engagement with the lower side of such mounting board laterally of such slot to transmit to such mounting board a reaction force when pull is exerted on the screw for moving the carrier plate, against the action of said springs, towards said mounting board for locking the equipment-carrier plate, said support-and-centering means being at least operable to permit, when the associated screw is slack, tilting movement of said at least one screw jointly with its support ring relative to the carrier plate to move the shaft and abutment collar of the screw from cooperation with the associated slot into the aperture of such mounting board.

2. A device as claimed in claim 1, wherein said support ring is provided with external as well as internal screw threads, the carrier plate being provided with screw threads in the hole for said at least one screw for cooperation with said external screw threads of the support ring.

3. An arrangement as claimed in claim 2, wherein the carrier plate is provided with a boss coaxial with the hole for said at least one screw, said screw-threaded hole being formed in the boss.

4. A device as claimed in claim 3, wherein said external screw thread is constructed as a quick pitch thread.

5. A device as claimed in claim 2, wherein the direction of the helical pitch of the external screw threads of the support ring is opposed to that of the internal screw threads of said ring.

6. A device as claimed in claim 1, wherein the support ring is provided at its outer circumference with bayonet studs and the carrier plate is provided with bayonet guide surfaces adjacent to its associated hole for cooperation with said bayonet studs.

7. A device as claimed in claim 1, wherein each of said anchoring screws is provided with such screw-threaded portion and equipped with such support ring.

References Cited
UNITED STATES PATENTS

| | | | |
|---|---|---|---|
| 1,131,399 | 3/1915 | McGinley | 151—41.7 |
| 1,168,728 | 1/1916 | Keith | 85—1.5 |
| 1,300,832 | 4/1919 | Gallagher | 85—1.5 |
| 2,289,514 | 7/1942 | Mastney et al. | 248—20 |
| 2,376,089 | 5/1945 | Savogeau | 151—69 |

EDWARD C. ALLEN, Primary Examiner

U.S. Cl. X.R.

151—69